United States Patent [19]
Gorsuch et al.

[11] Patent Number: 6,151,332
[45] Date of Patent: Nov. 21, 2000

[54] PROTOCOL CONVERSION AND BANDWIDTH REDUCTION TECHNIQUE PROVIDING MULTIPLE NB+D ISDN BASIC RATE INTERFACE LINKS OVER A WIRELESS CODE DIVISION MULTIPLE ACCESS COMMUNICATION SYSTEM

[75] Inventors: Thomas E. Gorsuch, Indialantic; Carlo Amalfitano, Melbourne Beach, both of Fla.

[73] Assignee: TANTIVY Communications, Inc., Melbourne, Fla.

[21] Appl. No.: 08/992,759

[22] Filed: Dec. 17, 1997

Related U.S. Application Data

[60] Provisional application No. 60/050,277, Jun. 20, 1997, and provisional application No. 60/050,338, Jun. 20, 1997.

[51] Int. Cl.[7] ............................................. H04J 3/16
[52] U.S. Cl. ............................................. 370/466; 370/468
[58] Field of Search .................................. 370/465, 466, 370/468, 469, 335, 342, 522, 524, 249; 375/200

[56] References Cited

U.S. PATENT DOCUMENTS

| | | | |
|---|---|---|---|
| 4,675,863 | 6/1987 | Paneth et al. | 370/50 |
| 4,817,089 | 3/1989 | Paneth et al. | 370/95 |
| 4,912,705 | 3/1990 | Paneth et al. | 370/95.1 |
| 5,022,024 | 6/1991 | Paneth et al. | 370/50 |
| 5,114,375 | 5/1992 | Wellhausen et al. | 446/246 |
| 5,282,222 | 1/1994 | Fattouche et al. | 375/1 |
| 5,325,419 | 6/1994 | Connolly et al. | 379/60 |
| 5,388,102 | 2/1995 | Griffith et al. | 370/512 |
| 5,412,429 | 5/1995 | Glover | 348/398 |
| 5,585,850 | 12/1996 | Schwaller | 348/388 |
| 5,617,423 | 4/1997 | Li et al. | 370/426 |
| 5,655,001 | 8/1997 | Cline et al. | 370/328 |
| 5,657,358 | 8/1997 | Paneth et al. | 375/356 |
| 5,687,194 | 11/1997 | Paneth et al. | 375/283 |
| 5,697,059 | 12/1997 | Carney | 455/34.1 |
| 5,845,211 | 12/1998 | Roach, Jr. | 455/436 |
| 5,854,786 | 12/1998 | Henderson et al. | 370/335 |

FOREIGN PATENT DOCUMENTS

| | | |
|---|---|---|
| 0 526 106 A2 | 2/1993 | European Pat. Off. . |
| 0 682 423 A2 | 11/1995 | European Pat. Off. . |
| 0 719 062 A2 | 6/1996 | European Pat. Off. . |
| WO 96/08934 | 3/1996 | WIPO . |
| WO 96/37081 | 11/1996 | WIPO . |

OTHER PUBLICATIONS

Melanchuk, et al., "CDPD and Emerging Digital Cellular Systems," *Digest of Papers of COMPCON*, Computer Society Conference 1996, Technologies for the Information Superhighway, Santa Clara, CA., No. Conf. 41, pp. 2–8 (Feb. 25, 1996), XP000628458 Institute of Electrical and Electronics Engineers.

*Primary Examiner*—Huy D. Vu
*Assistant Examiner*—Alexander Boakye
*Attorney, Agent, or Firm*—Hamilton, Brook, Smith & Reynolds, P.C.

[57] ABSTRACT

A technique for integrating services digital network (ISDN) and code division multiple access (CDMA) or other digital wireless communication protocols by a technique that strips off lower protocol layers, such as layers one and two of the ISDN protocol and sending only layer three and above messages over a more efficient wireless protocol.

13 Claims, 4 Drawing Sheets

PROTOCOL CONVERSION AND BANDWIDTH REDUCTION TECHNIQUE PROVIDING MULTIPLE NB+D ISDN BASIC RATE INTERFACE LINKS OVER A WIRELESS CODE DIVISION MULTIPLE ACCESS COMMUNICATION SYSTEM

CROSS REFERENCE TO RELATED APPLICATION(S)

This application claims the benefit of prior pending U.S. Provisional Application Ser. No. 60/050,277 filed Jun. 20, 1997 entitled "Protocol Conversion And Bandwidth Reduction Technique Providing Multiple nB+D ISDN Basic Rate Interface Links Over a Wireless Code Division of Multiple Access Communication System", and a prior pending U.S. Provisional Application Ser. No. 60/050,338 filed Jun. 20, 1997 entitled "Dynamic Bandwidth Allocation to Transmit a Wireless ISDN Protocol Across a Code Division Multiple Access (CDMA) Radio Link".

BACKGROUND OF THE INVENTION

The increasing use of wireless telephones and personal computers by the general population has led to a corresponding demand for advanced telecommunication services that were once thought to only be meant for use in specialized applications.

For example, in the late 1980's, wireless voice communication such as available with cellular telephony was the exclusive province of the businessman because of relatively high subscriber costs. The same was also true for access to remotely distributed computer networks, whereby until very recently, only business people and large institutions could afford the necessary expensive equipment to access computer networks.

However, the general population now increasingly wishes to not only have access to computer networks such as the Internet and private intranets, but also to have access to such networks in a wireless fashion as well. This is particularly of concern for the users of portable computers, laptop computers, hand-held personal digital assistants, and the like, who would prefer to access such networks without being tethered to a telephone line. There still is no widely available satisfactory solution for providing low cost, high speed access to the Internet and other computer networks using the existing wireless telephone systems such as cellular. This unfortunate situation is most likely an artifact of several circumstances. For example, the typical manner of providing high speed data service in the business environment over the wireline network is not readily adaptable to the voice grade service available in most homes or offices. Such standard high speed data services therefore do not lend themselves well to efficient transmission over standard cellular wireless handsets.

Furthermore, existing cellular network was originally designed only to deliver voice services. At present, the modulation schemes in use continue their focus on delivering voice information with the maximum data rate services in the range of only 9.6 kbps being available. This is because the cellular switching network in most countries, including the United States, uses analog voice channels having a bandwidth from about 300 to 3600 Hertz. Such a low frequency channel does not lend itself directly to transmitting data at rates of 28.8 kilobits per second (kbps) or even 56.6 kbps that is now commonly available using inexpensive wire line modems, and which rates are now thought to be the minimum acceptable data rates for Internet access.

Switching networks with higher speed building blocks are just now coming into use in the United States. Although certain wireline networks, called Integrated Services Digital Networks (ISDN), capable of higher speed data access have been known for a number of years, their costs have only been recently reduced to the point where they are attractive to the residential customer, even for wireline service. Although such networks were known at the time that cellular systems were originally deployed, for the most part, there is no provision for providing ISDN-grade data services over cellular network topologies.

SUMMARY OF THE INVENTION

The present invention provides high speed data and voice service over standard wireless connections via a unique integration of ISDN protocols and existing cellular signaling such as is available with Code Division Multiple Access (CDMA) type digital cellular systems.

The technique consists of establishing a logical connection using a higher layer protocol, such as a network layer protocol, from an ISDN subscriber unit, such as may be connected to a portable computer node, to an intended peer node, such as another computer. The network layer logical connection is made through a wireless channel which provides a physical layer connection between the portable computer node, through a base station, and the intended peer node. In response to relatively low utilization of the wireless channel, the physical layer channel is released while maintaining the appearance of a network layer connection to the higher level protocols.

This has two consequences. First, it frees wireless channel bandwidth for use by other subscriber units, without the overhead associated with having to set up an end to end connection each time that data needs to be transferred. In addition, and perhaps more importantly, by allocating wireless channels only when needed, the bandwidth necessary to provide a temporary but very high speed connection at critical times. These may occur, for example, when a particular subscriber unit requests that a web page file be downloaded from the Internet.

More specifically, the technique, which is here called spoofing, involves stripping off the two lower layers of the ISDN protocol while reformatting layer three and higher layer messages for transmission using a more efficient CDMA based encapsulated protocol.

For example, the network level connection can be maintained by looping back data and removing the sync and maintenance bits at the ISDN physical layer one. Spoofing of the second layer of the ISDN protocol, e.g., the LAPD protocol, is carried out by removing all repetitive protocol elements such as the flag bits from the ISDN data link layer two messages.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
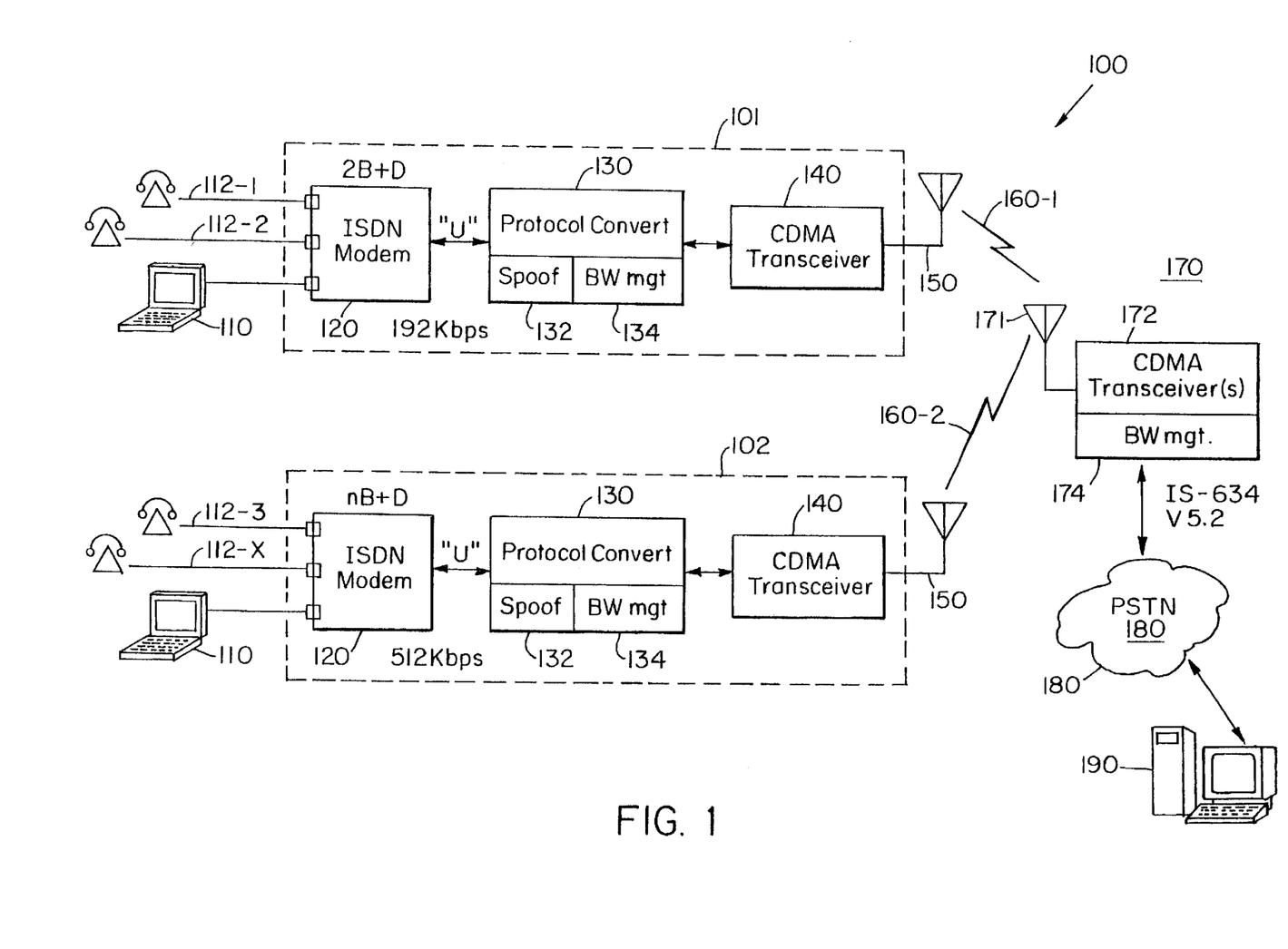
FIG. 1 is a block diagram of a wireless communication system making use of a protocol converter according to the invention.

Turning attention now to the drawings more particularly, FIG. 1 is a block diagram of a system 100 for providing high speed data and voice service over a wireless physical link by seamlessly integrating Integrated Services Digital Network (ISDN) formatted signaling such as received from a standard wireline ISDN modem with the signaling required by a digitally modulated wireless air interface such as Code Division Multiple Access (CDMA).

The system 100 consists of two different types of components, including subscriber units 101a and 101b (collectively 101) and base stations 170. The subscriber units 101 and base stations 170 cooperate to provide the functions necessary in order to achieve the desired implementation of the invention. The subscriber unit 101 provides wireless data services to a portable computing device 110 such as a laptop computer, portable computer, personal digital assistant (PDA) or the like. The base station 170 cooperates with the subscriber unit 101 to permit the transmission of data between the portable computing device 110 and other computing devices 190 such as those connected to the base station 170 either directly or through the Public Switched Telephone Network (PSTN) 180 via the radio channels 160.

More particularly, data and/or voice services are also provided by the subscriber unit 101 to the portable computer 110 as well as one or more other devices such as telephones 112-1, 112-2 (collectively referred to herein as telephones 112. (The telephones 112 themselves may in turn be connected to other modems and computers which are not shown in FIG. 1). In the usual parlance of ISDN, the portable computer 110 and telephones 112 are referred to as terminal equipment (TE). The subscriber unit 101 provides the functions referred to as a network termination type 1 (NT-1). The particular subscriber unit labeled 101a is meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a single subscriber unit 101.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions, which will be described in greater detail below. In general, spoofing 132 consists of insuring that the subscriber unit 101 appears to the terminal equipment 110, 112 as though it is connected to the public switched telephone network 180 on the other side of the base station 170 at all times. The bandwidth management function 134 is responsible for allocating and deallocating CDMA radio channels 160 as required.

The CDMA transceiver 140 accepts the data from the protocol converter 130 in a particular format and reformats this data in appropriate form for transmission through a subscriber unit antenna 150 over the CDMA radio channels 160-1. Data is then received at the base station 170 and is processed by the base station equipment 172. The base station unit 170 typically consists of one or more base station antennas 171, multiple CDMA transceivers 172, and a bandwidth management functionality 174. The base station 170 couples radio signals to the public switch telephone network 180 in a manner which is well known in the art. The base station 170 may communicate with the PSTN 180 over any number of different efficient communication protocols such as primary rate ISDN, or other LAPD based protocols such as IS-634 or V5.2.

It should also be understood that signals travel bidirectionally, i.e., data signals originate at the portable computer 110 are coupled to the PSTN 180, and data signals received from the PSTN 180 are coupled to the portable computer 110.

Other types of subscriber units such as unit 101b may be used to provide higher speed data services. Such subscriber units 102 typically provide a service referred to as nB+D type service that may use a so-called Primary Rate Interface (PRI) type ISDN protocol with the terminal equipment 110, 112. These units provide a higher speed service such as 512 kbps across the U interface. Operation of the protocol converter 130 and CDMA transceiver 140 are similar for the nB+D type subscriber unit 101b as previously described for subscriber unit 101a with the understanding that the radio links 160-2 to support subscriber unit 102 must either be greater in number or each have a greater bandwidth.

Figure 2:
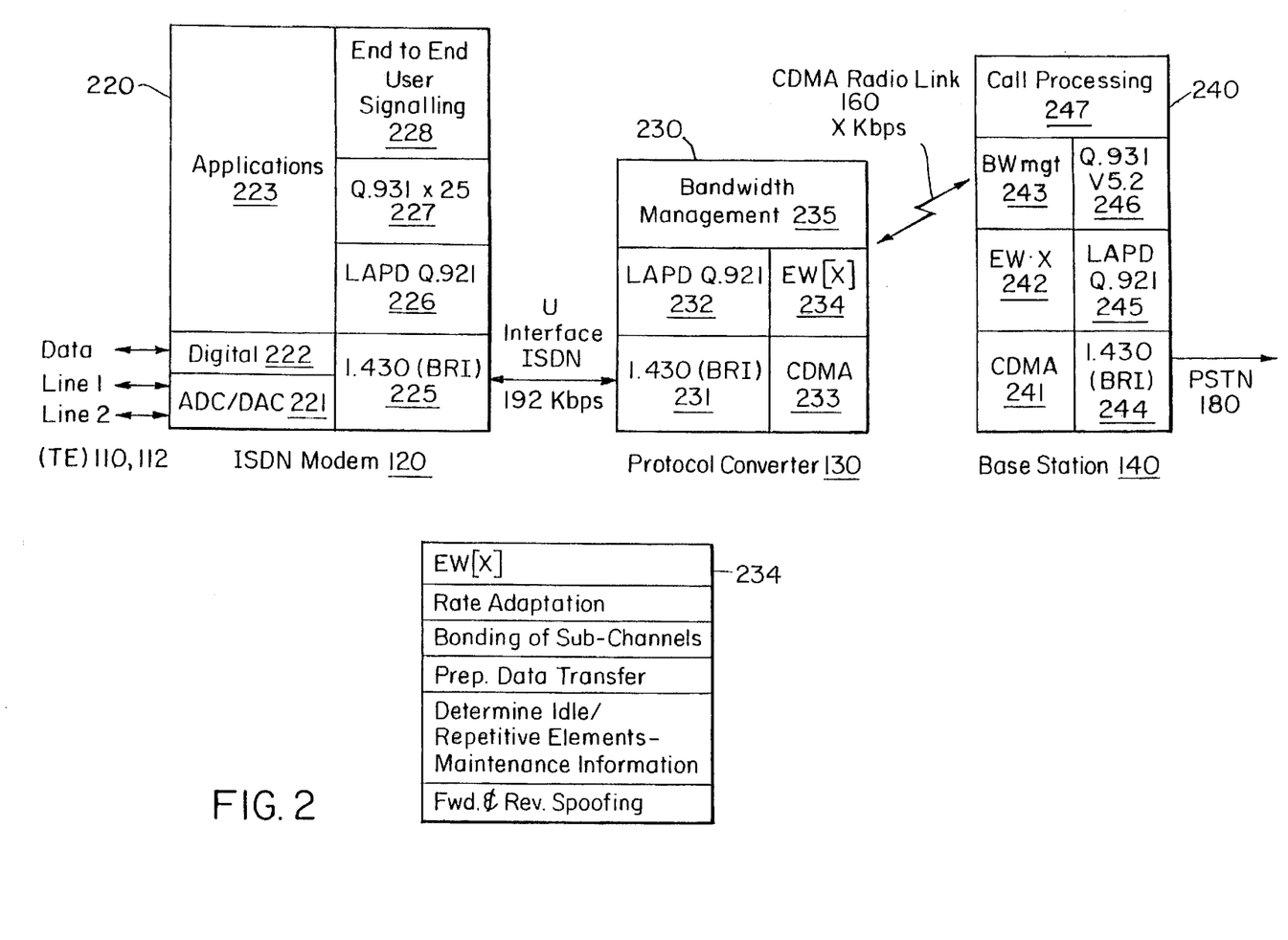
FIG. 2 is an Open Systems Interconnect (OSI) style layered protocol diagram showing the relationship between various protocols used in the invention.

Turning attention now to FIG. 2, the invention may be better understood in the context of a Open Systems Interconnect (OSI) layered protocol model diagram. The three protocol stacks 220, 230, and 240 are for the ISDN modem 120, protocol converter 130, and base station 170, respectively.

The protocol stack 220 used by the ISDN modem 120 is conventional for ISDN communications and includes, on the terminal equipment side, the analog to digital conversion (and digital to analog conversion) 221 and digital data formatting 222 at layer one, and an applications layer 223 at layer two. On the U interface side, the protocol functions include Basic Rate Interface (BRI) such as according to standard 1.430 at layer one, a LAPD protocol stack at layer two, such as specified by standard Q.921, and higher level network layer protocols such as Q.931 or X.227 and high level end to end signaling 228 required to establish network level logical connections.

The lower layers of the protocol stack 220 aggregate two bearer (B) channels to achieve a single 128 kilobits per second data channel in a manner which is well known in the art. Similar functionality can be provided in a primary rate interface such as used by subscriber unit 102 to aggregate multiple B channels to achieve up to 512 kilobits per second data rate over the U interface.

The protocol stack 230 associated with the protocol converter 130 consists of a layer one basic rate interface 231 and a layer two LAPD interface 232 on the U interface side, to match the ISDN modem stack 220. At the next higher network layer, a bandwidth management functionality 235 spans both the U interface side and the CDMA radio link side of the protocol converter stack 230. On the CDMA radio link side 160, the protocols depend upon the particular air interface in use. An efficient wireless protocol, referred to herein as EW[x] 234, encapsulates the layer one 231 and layer two 232 ISDN protocol stacks in such a manner that the terminal equipment 110 may be disconnected from one ore more CDMA radio channels 160 without interrupting the higher network layer connection.

The base station 170 contains the matching CDMA 241 and EW[x] 242 protocols as well as bandwidth management 243. On the PSTN side, the protocols may convert back to basic rate interface 244 and LAPD 245 only include higher level network layer protocols as Q.931 or V5.2 246.

Call processing functionality 247 allows the network layer to set up and tear down radio channels 160 and provide other processing required to support end to end connections between nodes as is known in the art.

The particular invention of interest herein is in the protocol stack 230 associated with the protocol converter 130. In particular, the spoofing function performed by EW[x] 234 include the necessary functions to keep the U interface for the ISDN connection properly maintained, even without the continuous availability of a radio channel 160 of sufficient bandwidth for the duration of the network layer connection. This is necessary because ISDN expects to send and receive a continuous stream of synchronous data bits regardless of whether the terminal equipment at either end actually has any data to transmit. Without the spoofing function 132, radio links 160 of sufficient bandwidth to support at least a 192 kbps data rate would otherwise be required throughout the duration of an end to end network level connection, whether or not data actually needs to be transmitted.

EW[x] 234 therefore involves having the CDMA transceiver 140 loop back continuous synchronous data bits over the ISDN communication path to spoof the terminal equipment 110, 112 into believing that a sufficiently wide wireless communication path 160 is continuously available. However, only when there is actually data present on the terminal equipment to the wireless transceiver 140 does the side bandwidth be allocated. Therefore, unlike the prior art, the network layer need not allocate the assigned wireless bandwidth over the radio channels 160 for the entirety of the network layer communications session. That is, when data is not being transmitted between the portable computer 110 and the remote node bandwidth management function 235 deallocates initially assigned radio channel bandwidth 160 and makes it available for another transceiver and another subscriber unit 101.

Figure 3:
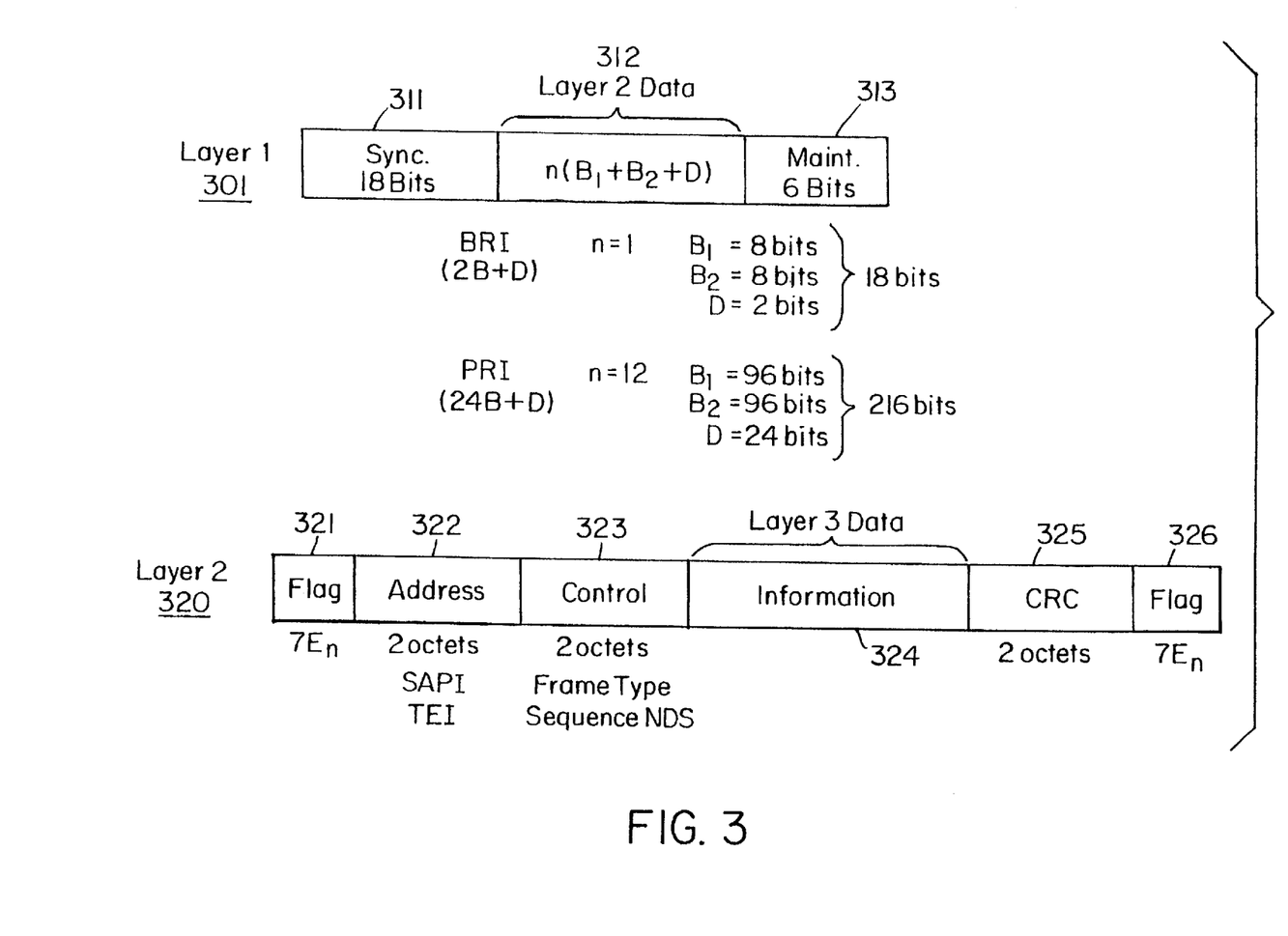
FIG. 3 depicts ISDN layer one and layer two frame formats.

This is accomplished operating on both the ISDN layer one and layer two frames. As shown in FIG. 3, the format of an ISDN layer one frame 310 is shown as including a number of fields such as a sync bit field 311, data field 312, and maintenance bit field 313. The data field 312 includes either 18 bits or 216 bits, depending upon whether the device is a BRI device 101*a* or PRI type device 101*b*.

The layer two frame 320 format includes an initial flag field 312, address field 322, control field 323, layer 10 three data field 324, a cyclic redundancy check field 325, one or more terminating flag fields 326. The flag fields typically include the binary patterns 7E (hexadecimal).

The address field 322 identifies service access points and terminal equipment addresses, the control field 323 identifies frame type and sequence numbers, and the cyclic redundancy check field 325 includes checking information as is known in the art. The information field 324 encapsulates information used by layer three.

In accordance with the invention, information specific to layer one and layer two is stripped off by the spoofer 132 so that only layer three information is fed to the CDMA function 323. In addition, the EW[x] protocol 234 loops back all repetitive "echo bits" such as the layer two flag bits 321, 326, and layer one sync and maintenance bits, such as to keep the U interface operating as though the higher level wireless connection was continuously available.

Therefore, only non-repetitive layer three information is sent through the CDMA transceiver, which occurs only during session set up and when actual information must be sent from end to end.

Figure 4:
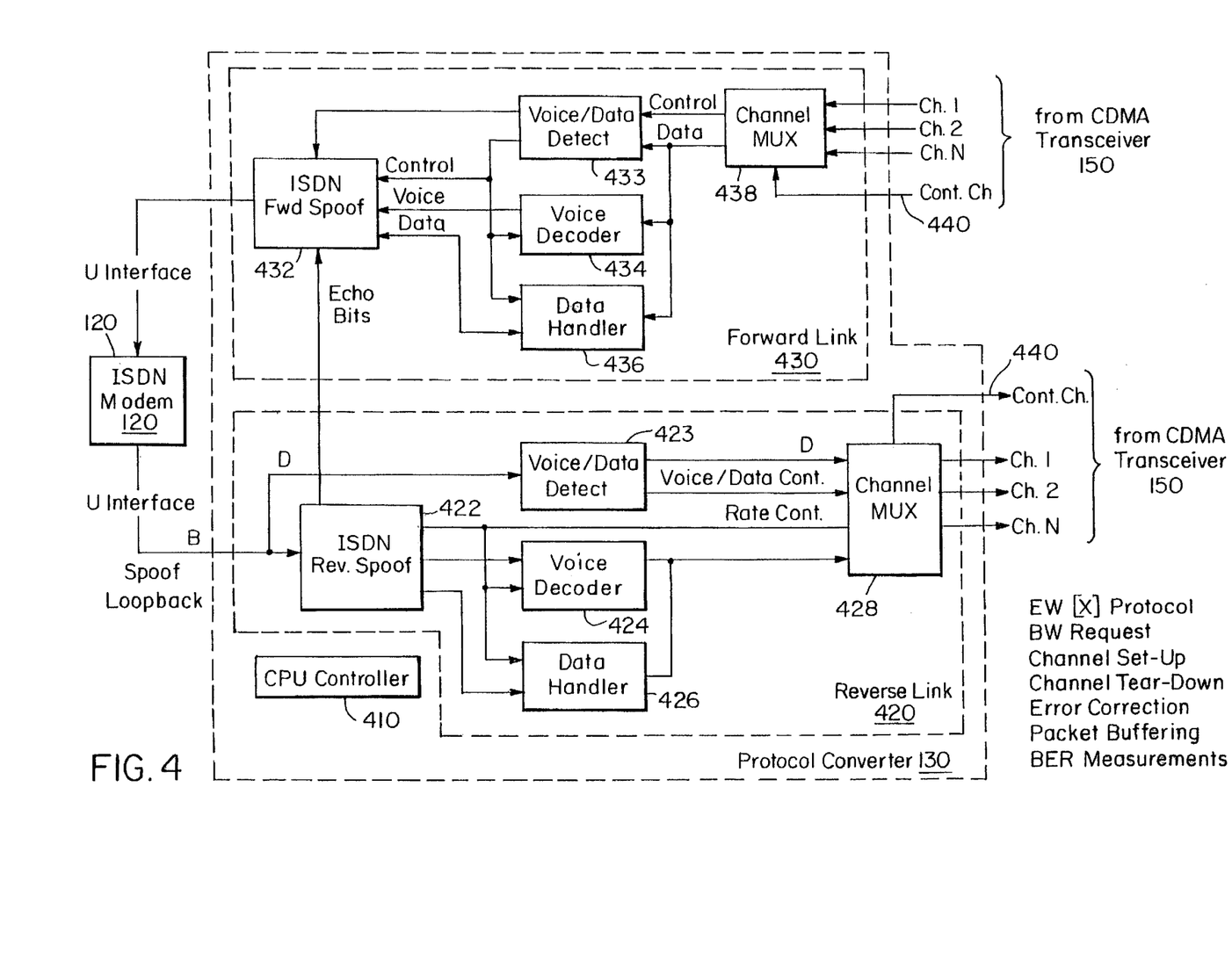
FIG. 4 is a detailed block diagram of the protocol converter which performs spoofing and bandwidth allocation according to the invention.

To understand more fully how this is accomplished, turn now to FIG. 4 which is a more detailed functional diagram of the components of a protocol converter 130. It can be seen that an exemplary protocol converter 130 consists of a microcontroller 410, reverse link processing 420, and forward link processing 430. Reverse link processing 420 further includes ISDN reverse spoofer 422, voice data detector 423, voice decoder 424, packet processor 426, and channel multiplexer 428. The forward link processing 430 contains analogous functions operating in the reverse direction, including a channel multiplexer 438, voice data detector 433, voice decode 434, packet processor 436, and ISDN forward spoofer 432.

In operation, the reverse link 420 first accepts channel data from the ISDN modem 120 over the U interface and forwards it to the ISDN reverse spoofer 432. Any echo bits (e.g., the aforementioned layer one sync bits 311 and maintenance bits 313 as well as layer two flag bits 321, address 322, control 323, and CRC 325 bits) are removed from data received and, once extracted, and sent to the forward spoofer 432. The remaining layer three and higher level bits are thus information that needs to be send over a wireless link.

This extracted data is sent to the voice decoder 424 or packet processor 426, depending upon the type of data being processed.

Any D channel data from the ISDN modem 120 is sent directly to voice data detection 423 for insertion on the D channel inputs to the channel multiplexer 428. The voice data detection circuit 423 determines the content of the D channels by analyzing commands received on the D channel.

D channel commands may also be interpreted to control a class of wireless services provided. For example, the controller 410 may store a customer parameter table that contains information about the customers desired class of service which may include parameters such as maximum data rate and the like. Appropriate commands are thus sent to the channel multiplexer 428 to request one or more required radio channels 160 for communication. Then, depending upon whether the information is voice or data, either the voice decoder 424 or packet processor 426 begins feeding data inputs to the channel multiplexer 428.

It should also be understood that each of the radio channels 160 is not necessarily of a sufficient bandwidth to individually carry an ISDN bandwidth of 56 kbps or even 128 kbps. Rather, in the preferred embodiment, the radio channels 160 are actually rather narrow in bandwidth, such as only sufficiently wide enough to support, say, an 8 kbps data rate. The radio channels 160 are thus allocated to particular network layer connections only upon demand. For more details of a preferred process for allocating radio channels 160, reference should be made to our co-pending U.S. application entitled "Dynamic Bandwidth Allocation to Transmit a Wireless Protocol Across a Code Division Multiple Access (CDMA) Radio Link," Ser. No. 08/992,760, filed on even date herewith and assigned to H.Q. Wireless, Inc., the assignee of this application.

In any event, the channel multiplexer 428 performs the necessary multiplexing of radio channels 160.

The channel multiplexer 428 may make further use of a voice data control signals provided by the voice data detection circuits 423, depending upon whether the information is voice or data.

In addition, the CPU controller 410, operating in connection with the channel multiplexer 428, provides the necessary implementation of the EW[x] protocol between the subscriber unit 101 and the base station 170. For example, radio channel requests, channel setup, and channel tear down commands are sent via commands placed on a control channel 440. These commands are intercepted by the equivalent functionality in the base station 170 to cause the proper allocation of radio frequency channels 160 to particular connections.

The packet processor 426 provides an estimate of the data rate required to the CPU controller 410 so that appropriate commands can be sent over the control channel 440 to allocate an appropriate number of radio channels. The packet processor 426 may also perform packet assembly and buffering of the layer three data into the appropriate format for transmission over the CDMA radio links 160.

The forward link 430 operates in analogous fashion. In particular, signals are first received from the channels 160 by the channel multiplexer 438. In response to receiving information on the control channels 440, control information is routed to the voice data detection circuit 433. Upon a determination that the received information contains data, the received bits are routed to the packet processor 436. Alternatively, the information is voice information, and routed to the voice decoder 434.

Voice and data information are then sent to the ISDN forward spoofer 432 for construction into proper ISDN protocol format. This assembly of information is coordinated with the receipt of echo bits from the ISDN reverse spoofer 422 to maintain the proper expected synchronization on the U interface with the ISDN modem 120.

It can now be seen how an ISDN communication path may be paused even though wireless bandwidth initially allocated for transmission is reassigned to other uses when the ISDN path is idle. In particular, the reverse 422 and forward 432 spoofers cooperate to loop back non-information bearing signals, such as flag patterns, sync bits, and other necessary information, so as to spoof the data terminal equipment connected to the ISDN modem 120 into continuing to operate as though the allocated wireless path over the CDMA transceiver 150 is continuously available.

Therefore, unless there is an actual need to transmit information from the terminal equipment being presented to the channel multiplexers 428, or actual information being received from the channel multiplexers 438, the invention may deallocate initially assigned bandwidth thus making it available for another CDMA transceiver 150 associated with another subscriber unit 101 of the wireless system 100.

The CPU controller 410 may also perform additional functions to implement the EW[x] protocol, including error correction, packet buffering, and bit error rate measurement.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, other digital wireless modulation schemes and services may be used that provide multiple access to a given radio channel, such as frequency division multiple access (FDMA) or time division multiple access (TDMA). However, at the present time FDMA modulation schemes do not appear to be as efficient as CDMA since they may require multiple channel radio frequency circuits to accomplish the same results herein. Furthermore, TDMA protocols may require additional synchronization, especially for the reverse link.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. For use with a digital communication network having a first digital communication path for coupling Integrated Services Digital Network (ISDN) communication signals with a first wireless transceiver at a first site, said first wireless transceiver being operative to conduct wireless communications with a second wireless transceiver at a second site, a method of controlling bandwidth utilization of said network comprising the steps of:

(a) in response to establishment of a communication session between said first and second sites, controlling said first wireless transceiver to appear to said first digital communication path as though the bandwidth is continuously available during said communication session for wireless communications between said first and second transceivers, irrespective of the need to transport ISDN communication signals between said first and second sites; and (b) in the absence of said need to transport ISDN communication signals between said first and second sites, making said bandwidth available for wireless communication by another wireless transceiver of said digital communication network.

2. A method as in claim 1 additionally comprising the step of:

(c) maintaining a connection at a network layer above a data link layer by establishing a lower level connection and using radio frequency bandwidth only when required.

3. A method as in claim 1 additionally comprising the step of:

looping back synchronizing and maintenance bits on the ISDN link to spoof an ISDN physical layer protocol.

4. A method as in claim 1 additionally comprising the step of:

looping back an LAPD layer protocol by removing flag bits.

5. For use with a digital communication network having a first digital communication path for coupling data communication signals with a first wireless transceiver at a first site, said first wireless transceiver being operative to conduct wireless communications with a second wireless transceiver at a second site, a method of controlling wireless communication bandwidth comprising the steps of:

(a) in response to establishment of a communication session between said first and second sites, controlling said first wireless transceiver to appear to said first digital communication path as though the bandwidth is continuously available during said communication session for wireless communications between said first and second transceivers, irrespective of a need to transport data communication signals between said first and second sites; and (b) in the absence of said need to transport data communication signals between said first and second sites, making said bandwidth available for wireless communication by another wireless transceiver of said digital communication network.

6. A method as in claim 5 additionally comprising the step of:

(c) maintaining a connection at a network layer above a data link layer by establishing a lower level connection and using radio frequency bandwidth only when required.

7. A method as in claim 6 additionally comprising the step of:

(d) looping back synchronizing and maintenance bits on the link layer to spoof a physical layer protocol.

8. A method as in claim 6 additionally comprising the step of:

(e) looping back a higher layer protocol by removing flag bits.

9. A method as in claim 5 wherein the first and second wireless transceivers use Code Division Multiple Access (CDMA) to conduct wireless communication.

10. A digital communication system comprising:

a first wireless transceiver located at a first site, said first wireless transceiver being coupled to receive data communication signals from a first digital communication path, and being operative to conduct wireless communications:

a second wireless transceiver located at a second site, said second wireless transceiver being operative to conduct wireless communication with said first wireless transceiver;

means for establishing a communication session between said first and second sites, and for controlling said first wireless transceiver to appear to said first digital communication path as though communication bandwidth is continuously available during said communication session for wireless communication between said first and second transceivers, irrespective of a need to transport data communication signals between said first and second sites;

means for making said bandwidth available for wireless communication by another wireless transceiver of said digital communication network, in the absence of said need to transport data communication signals between said first and second sites; and means for maintaining a connection at a network layer above a data link layer by establishing a lower level connection and using radio frequency bandwidth only when required.

11. A system as in claim 10 additionally comprising:

means for looping back synchronizing and maintenance bits on the like layer to spoof a physical layer protocol.

12. A system as in claim 10 additionally comprising:

means for looping back a higher layer protocol by removing flag bits.

13. A system as in claim 10 wherein the first and second wireless transceivers use Code Division Multiple Access (CDMA) to conduct wireless communication.

* * * * *

(12) EX PARTE REEXAMINATION CERTIFICATE (8660th)
United States Patent
Gorsuch et al.

(10) Number: US 6,151,332 C1
(45) Certificate Issued: Nov. 15, 2011

(54) PROTOCOL CONVERSION AND BANDWIDTH REDUCTION TECHNIQUE PROVIDING MULTIPLE NB+D ISDN BASIC RATE INTERFACE LINKS OVER A WIRELESS CODE DIVISION MULTIPLE ACCESS COMMUNICATION SYSTEM

(75) Inventors: Thomas E. Gorsuch, Indialantic, FL (US); Carlo Amalfitano, Melbourne Beach, FL (US)

(73) Assignee: Tantivy Communications, Inc., Wilmington, DE (US)

Reexamination Request:
No. 90/008,990, Apr. 15, 2008

Reexamination Certificate for:
Patent No.: 6,151,332
Issued: Nov. 21, 2000
Appl. No.: 08/992,759
Filed: Dec. 17, 1997

Related U.S. Application Data (60) Provisional application No. 60/050,277, filed on Jun. 20, 1997, and provisional application No. 60/050,338, filed on Jun. 20, 1997.

(51) Int. Cl.
*H04J 3/16* (2006.01)

(52) U.S. Cl. ........................................ 370/466; 370/468
(58) Field of Classification Search ........................ None
See application file for complete search history.

(56) References Cited

To view the complete listing of prior art documents cited during the proceeding for Reexamination Control Number 90/008,990, please refer to the USPTO's public Patent Application Information Retrieval (PAIR) system under the Display References tab.

*Primary Examiner*—Colin M Larose (57) ABSTRACT

A technique for integrating services digital network (ISDN) and code division multiple access (CDMA) or other digital wireless communication protocols by a technique that strips off lower protocol layers, such as layers one and two of the ISDN protocol and sending only layer three and above messages over a more efficient wireless protocol.

At the time of issuance and publication of this certificate, the patent remains subject to pending reissue application No. 12/788,716 filed May 27, 2010. The claim content of the patent may be subsequently revised if a reissue patent is issued from the reissue application.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 5, 6, 9, 10 and 13 are cancelled.

Claims 1-4, 7, 8, 11 and 12 were not reexamined.

* * * * *